US012752496B2

(12) United States Patent
Matsushima et al.

(10) Patent No.: US 12,752,496 B2
(45) Date of Patent: Oct. 6, 2026

(54) FLAT LIGHTWEIGHT MEMBER AND METHOD OF PRODUCING THE SAME

(71) Applicant: Toray Industries, Inc., Tokyo (JP)

(72) Inventors: Shogo Matsushima, Nagoya (JP); Yusuke Tsumura, Nagoya (JP); Akihiko Nishizaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 196 days.

(21) Appl. No.: 18/281,321

(22) PCT Filed: Feb. 24, 2022

(86) PCT No.: PCT/JP2022/007545
§ 371 (c)(1),
(2) Date: Sep. 11, 2023

(87) PCT Pub. No.: WO2022/209455
PCT Pub. Date: Oct. 6, 2022

(65) Prior Publication Data
US 2024/0149540 A1 May 9, 2024

(30) Foreign Application Priority Data
Mar. 30, 2021 (JP) ................................ 2021-056516

(51) Int. Cl.
*B29C 70/42* (2006.01)
*B29C 44/06* (2006.01)
(Continued)

(52) U.S. Cl.
CPC .............. *B29C 70/42* (2013.01); *B29C 44/06* (2013.01); *B29C 70/10* (2013.01); *B29K 2105/08* (2013.01)

(58) Field of Classification Search
CPC ......... B29C 70/42; B29C 44/06; B29C 70/10; B29C 70/222; D04H 3/07; B29D 99/0028;
(Continued)

(56) References Cited

U.S. PATENT DOCUMENTS 4,292,101 A 9/1981 Reichert
5,242,637 A * 9/1993 Inoue ...................... B32B 38/08 264/273
(Continued)

FOREIGN PATENT DOCUMENTS

JP H3-180329 A 8/1991
JP H0427532 A 1/1992
(Continued)

OTHER PUBLICATIONS

International Search Report dated Apr. 19, 2022 in counterpart International Application No. PCT/JP2022/007545 w/English translation.
(Continued)

*Primary Examiner* — Philip C Tucker
*Assistant Examiner* — Hana C Page
(74) *Attorney, Agent, or Firm* — DLA Piper LLP (US)

(57) ABSTRACT

A flat lightweight member includes fiber reinforced plastics and having excellent mechanical properties of an end portion and excellent adhesiveness between a core layer and a skin layer as well as good appearance quality and excellent producibility, the flat lightweight member includes a skin layer including a braiding material and a matrix resin, a separation layer having a bag shape and being present inside the braiding material, and a mixture of a matrix resin and a thermally expandable material, the mixture being present inside the separation layer.

11 Claims, 6 Drawing Sheets

(51) Int. Cl.
*B29C 70/10* (2006.01)
*B29K 105/08* (2006.01)

(58) Field of Classification Search
CPC .. B32B 5/20; B32B 5/245; B32B 5/26; B32B 27/12
See application file for complete search history.

(56) References Cited

U.S. PATENT DOCUMENTS

| | | | | |
|---|---|---|---|---|
| 5,619,903 | A * | 4/1997 | Rogers | D04C 3/40 87/8 |
| 10,024,301 | B2 * | 7/2018 | Waas | F03D 1/0675 |
| 10,041,472 | B2 * | 8/2018 | Donazar Moriones | F03D 1/0675 |
| 2001/0013669 | A1 | 8/2001 | Cundiff et al. | |
| 2021/0129395 | A1 * | 5/2021 | Sjostedt | B29B 15/12 |

FOREIGN PATENT DOCUMENTS

| | | | |
|---|---|---|---|
| JP | H6-315995 | A | 11/1994 |
| JP | H8-276441 | A | 10/1996 |
| JP | 2012-71805 | A | 4/2012 |
| JP | 5466076 | B2 | 4/2014 |
| JP | 2015196281 | A | 11/2015 |
| JP | 2020-163809 | A | 10/2020 |
| JP | 6789887 | B2 | 11/2020 |

OTHER PUBLICATIONS

Written Opinion dated Apr. 19, 2022 in counterpart International Application No. PCT/JP2022/007545.
European Search Report dated Jan. 2, 2025, from counterpart European Application No. 22779680.2.
Office Action dated Nov. 10, 2025, from counterpart Japanese Application No. 2022-513438.

* cited by examiner a
b
1
A
A'

22
31
42
1
41
50

23
32
45
51
44
1
43

23
33
47
52
34
1
46

100

100
40

100
40
35

100
82

81
82

81
82

1

FLAT LIGHTWEIGHT MEMBER AND METHOD OF PRODUCING THE SAME

TECHNICAL FIELD

This disclosure relates to a flat lightweight member (fiber reinforced plastics) including a skin layer on a surface and a core layer inside, which can be used as a propeller blade, and a method of producing the flat lightweight member. Specifically, this disclosure relates to a method of producing a flat lightweight member made of fiber reinforced plastics having excellent mechanical properties of an end portion and excellent adhesiveness between a core layer and a skin layer as well as good appearance quality and excellent producibility.

BACKGROUND

Fiber-reinforced plastics are used in a wide range of industrial fields because of their light weight, high strength, and high rigidity. In particular, a molded article employing a prepreg that is an intermediate material obtained by impregnating a fiber reinforcing material made of filaments such as reinforcing fibers with a resin is suitably used. In addition, a sandwich-structured material in which a skin layer is a fiber-reinforced plastic and a core layer is porous is effectively used in transportation facilities such as aircraft, automobiles, and ships and in the sports and leisure fields because of its lightweight properties and toughness. As a molded article having such a sandwich structure, a molded article including a skin layer formed of a fiber reinforced material and a core layer formed of a thermally expandable material and a matrix resin is known.

As such a molded article, there is known a propeller blade in which an upper surface prepreg and a lower surface prepreg are laminated and bonded in the thickness direction at the end portion of the molded article. That molded article is obtained by laminating the upper surface prepreg in one split mold and the lower surface prepreg in the other split mold and disposing a foaming agent inside a space formed by both the prepregs when the molds are joined (for example, Japanese Patent No. 6789887).

As a similar propeller blade, there is known a molded article in which a main part is composed of a skin layer, a core layer, and a separation layer, a peripheral part (a portion of an outer periphery of the propeller blade when the propeller blade is viewed from a direction in which the projected area is largest) is composed of the skin layer and the core layer, and reinforcing fibers for reinforcement are additionally disposed on a leading edge and a trailing edge of the propeller blade. In that molded article, the separation layer that suppresses passing of the thermally expandable material is disposed between the core layer and the skin layer. The separation layer separates the thermally expandable material out of the mixture of the thermally expandable material and the matrix resin constituting the core layer so that a dry reinforcing fiber material constituting the skin layer is impregnated with only the matrix resin to form the skin layer (for example, Japanese Patent Laid-open Publication No. H8-276441).

As a form of the reinforcing fiber material, a technique in which a fiber material is formed into braiding (braid or plait) is also known. Braiding is made by braiding fiber strands in two or three directions and mechanically interweaving the braided fiber strands into a cylindrical shape or another shape. Since the fiber material can thus be produced to have a desired shape by automatic operation, the production efficiency of the reinforcing fiber material can be improved.

However, in the flat lightweight member in which the upper surface prepreg and the lower surface prepreg are laminated and bonded in the thickness direction at the end portion of the molded article as described above, a region where the prepregs are laminated and bonded is required at the end portion. Therefore, it is necessary to dispose the prepregs having a specific gravity larger than that of the core layer even in a region to be by rights used as the core layer for lightweight properties, and there has been a problem that the weight of the flat lightweight member increases. For the same reason, the shape of the flat lightweight member to which such a configuration can be applied may be limited. On the other hand, when a structure in which the end portions of the prepregs are simply butted against each other is adopted, there has been a problem that the strength of the joint portion is reduced and the foaming resin leaks to the outside of the flat lightweight member to impair the appearance and the surface quality.

In addition, in a conventional flat lightweight member in which the main part is composed of a skin layer, a core layer, and a separation layer, the peripheral part is composed of the skin layer and the core layer, and reinforcing fibers for reinforcement are additionally disposed on a leading edge and a trailing edge, there is a possibility that peeling occurs in the vicinity of the separation layer when used for a long period of time when the arrangement position of the separation layer is not appropriate, and there has been a problem that the core layer and the skin layer cannot be firmly integrated.

Furthermore, in a conventional method of producing fiber-reinforced plastics, in which a an upper surface prepreg is laminated on one split mold, a lower surface prepreg is laminated on the other split mold, and a foaming agent is disposed inside a space formed by both the prepregs when the molds are joined, it is necessary to heat the molds after the prepregs are laminated at room temperature on the surfaces of the molds having three-dimensional shapes to cure the prepregs, and not only a large amount of labor and a special technique and device are required for the lamination step, but also a large amount of time is required to raise and lower the temperature of the molds so that there has been a problem in productivity.

In addition, in a conventional method of producing fiber-reinforced plastics in which a skin layer is formed by allowing a part of a matrix resin that forms a core layer to pass through a separation layer, impregnating the matrix resin into a dry reinforcing fiber material, and curing the matrix resin, when the flat lightweight member has a three-dimensional shape instead of a simple flat plate shape, it has been difficult to obtain a flat lightweight member with high accuracy and small variation because the separation layers individually disposed on the upper and lower sides are displaced at the time of molding. In addition, it is difficult to position reinforcing fibers for reinforcement, and the reinforcing fibers are easily displaced during molding so that the center of gravity of the flat lightweight member may change. Further, in the process of impregnating the reinforcing fibers with the matrix resin, air bubbles called voids may be formed at the end portion of the flat lightweight member, and the mechanical properties may be deteriorated or the appearance product may be impaired.

In the conventional technique as described above, it has been extremely difficult to obtain a flat lightweight member having excellent mechanical properties and adhesiveness between the core layer and the skin layer up to the end portion of the flat lightweight member and having good appearance quality as described above.

Therefore, it could be helpful to provide a flat lightweight member made of fiber reinforced plastics and has excellent mechanical properties of an end portion and excellent adhesiveness between a core layer and a skin layer as well as good appearance quality and excellent producibility, and a method of producing the flat lightweight member.

SUMMARY

We thus provide:

(1) A flat lightweight member including a skin layer including a braiding material and a matrix resin, a separation layer having a bag shape and being present inside the braiding material, and a mixture of a matrix resin and a thermally expandable material, the mixture being present inside the separation layer.

(2) The flat lightweight member according to (1), in which the braiding material includes a plurality of fiber strands serving as central yarns arranged in parallel in a same direction and a fiber strand serving as a plaited yarn intersecting the central yarns, and a weight per unit length of one of the fiber strands serving as the central yarns used in at least one end region of the flat lightweight member is smaller than a weight per unit length of one of the fiber strands serving as the central yarns used in a central region of the flat lightweight member.

(3) The flat lightweight member according to (1), in which the braiding material includes a plurality of fiber strands serving as central yarns arranged in parallel in a same direction and a fiber strand serving as a plaited yarn intersecting the central yarns, a weight per unit length of one of the fiber strands serving as the central yarns used in one end region of the flat lightweight member is smaller than a weight per unit length of one of the fiber strands serving as the central yarns used in a central region of the flat lightweight member, and a weight per unit length of one of the fiber strands serving as the central yarns used in another end region of the flat lightweight member is larger than a weight per unit length of the one of the fiber strands serving as the central yarns used in the central region of the flat lightweight member.

(4) The flat lightweight member according to any one of (1) to (3), further including at least one rib portion containing a fiber reinforced material inside the braiding material, in which the separation layer and the mixture are present in each of a plurality of regions inside the braiding material separated by the rib portion.

(5) The flat lightweight member according to (4), in which the rib portion includes the fiber reinforced material and a foam and/or a resin block disposed inside the fiber reinforced material.

(6) A method of producing a flat lightweight member, including:

a braiding material production step of producing a braiding material constituting a skin layer;

a separation layer disposing step of disposing a separation layer having a bag shape corresponding to an outer shape of the flat lightweight member inside the braiding material;

a charging step of charging a mixture of a matrix resin and a thermally expandable material inside the separation layer;

a step of disposing in a cavity of a lower mold heated to a molding temperature the braiding material containing the separation layer and the mixture disposed inside;

a mold closing step of closing an upper mold heated to the molding temperature and vacuuming the inside of the cavity; and an expansion step of expanding the thermally expandable material to integrate the braiding material, the separation layer, and the mixture.

(7) A method of producing a flat lightweight member including at least one rib portion, the method including:

a braiding material production step of producing a braiding material constituting a skin layer;

a preparation step of preparing a fiber reinforced material constituting a rib portion;

a rib disposing step of disposing inside the braiding material the fiber reinforced material constituting the rib portion to divide the inside of the braiding material into two or more spaces;

a separation layer disposing step of disposing in the two or more spaces a separation layer having a bag shape corresponding to shapes of the two or more spaces;

a charging step of charging a mixture of a matrix resin and a thermally expandable material inside the separation layer;

a material disposing step of disposing on a lower mold heated to a molding temperature the braiding material containing the separation layer, the mixture, and the fiber reinforced material constituting the rib portion disposed inside;

a mold closing step of closing an upper mold heated to the molding temperature and vacuuming the inside of a mold cavity; and an expansion step of expanding the thermally expandable material to integrate the braiding material, the separation layer, the mixture, and the fiber reinforced material constituting the rib portion.

(8) The method of producing a flat lightweight member according to (7), in which the rib portion is constituted of the fiber reinforced material and a foam and/or wood disposed inside the fiber reinforced material.

(9) The method of producing a flat lightweight member according to any one of (6) to (8), in which, in the braiding material production step, a plurality of fiber strands serving as central yarns arranged in parallel in a same direction and a fiber strand serving as a plaited yarn intersecting the central yarns constitute the braiding material, and a fiber strand smaller than one of the fiber strands serving as the central yarns in a central region of the flat lightweight member is used for one of the fiber strands serving as the central yarns in at least one end region of the flat lightweight member.

(10) The method of producing a flat lightweight member according to any one of (6) to (8), in which, in the braiding material production step, a plurality of fiber strands serving as central yarns arranged in parallel in a same direction and a fiber strand serving as a plaited yarn intersecting the central yarns constitute the braiding material, a fiber strand smaller than one of the fiber strands serving as the central yarns in a central region of the flat lightweight member is used for one of the fiber strands serving as the central yarns in one end region of the flat lightweight member, and a fiber strand larger than the one of the fiber strands serving as the central yarns in the central region of the flat lightweight member is used for one of the fiber strands serving as the central yarns in another end region of the flat lightweight member.

(11) The method of producing a flat lightweight member according to any one of (6) to (10), in which both the fiber strands serving as the central yarns and the fiber strand serving as the plaited yarn constituting the braiding material are dry fiber strands.

(12) The method of producing a flat lightweight member according to any one of (6) to (10), in which both the fiber strands serving as the central yarns and the fiber strand serving as the plaited yarn constituting the braiding material are a prepreg containing a resin.

With our flat lightweight members and our methods of producing the flat lightweight members, a flat lightweight member made of fiber reinforced plastics and having excellent mechanical properties of an end portion and excellent adhesiveness between a core layer and a skin layer as well as good appearance quality and excellent producibility can be obtained.

DESCRIPTION OF REFERENCE SIGNS

Figure 1A:
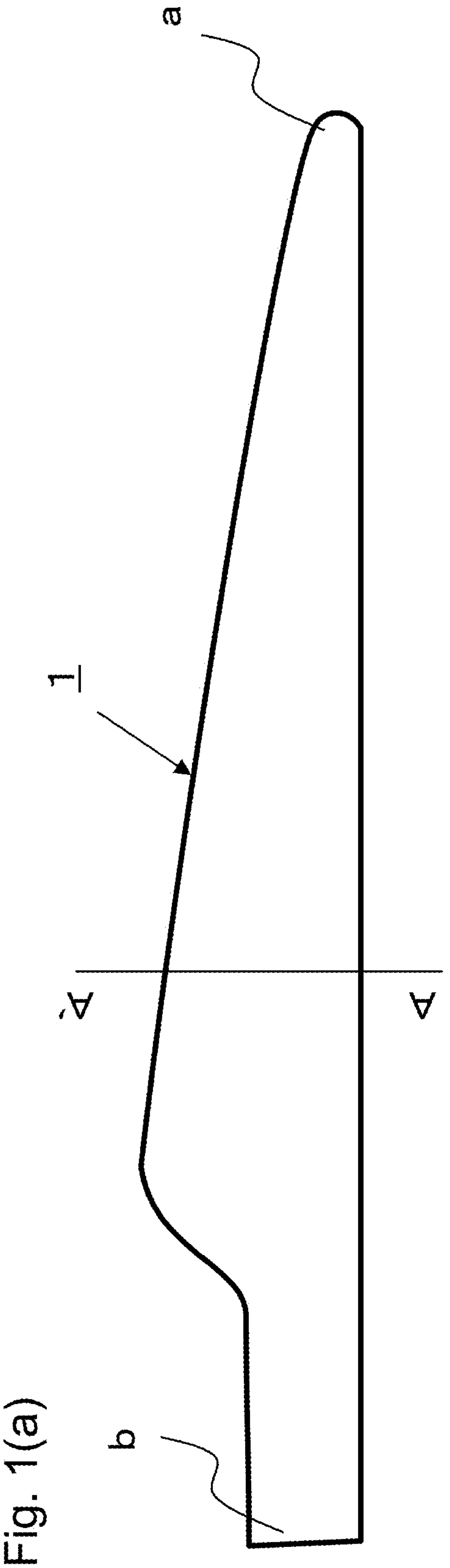
FIG. 1(*a*) is a top view, and FIG. 1(*b*) is a cross-sectional view taken along the line A-A', in an example of a flat lightweight member obtained by our method.

1: Flat lightweight member
21, 22, 23: Skin layer
30, 31, 32, 33: Core layer
34: Core material
35: Mixture
40, 41, 42, 43, 44, 45, 46, 47: Separation layer
50, 51, 52: Fiber reinforced material constituting rib portion
60, 61: Plaited yarn
70, 71, 72, 73: Central yarn
80: Central region
81: Upper mold
82: Lower mold
90, 91: End region
100: Braiding material
X: Width direction
Y: Longitudinal direction
a: Tip portion
b: Root portion

DETAILED DESCRIPTION

Hereinafter, our members and methods will be described in detail with reference to examples and the drawings.

Our method of producing a flat lightweight member includes:

a braiding material production step of producing a braiding material constituting a skin layer;

a separation layer disposing step of disposing a bag-shaped separation layer having an outer shape of the flat lightweight member inside the braiding material;

a charging step of charging a mixture of a matrix resin and a thermally expandable material inside the separation layer;

a step of disposing on a lower mold heated to a molding temperature the braiding material containing the separation layer and the mixture disposed inside;

a mold closing step of closing an upper mold heated to the molding temperature and vacuuming the inside of a cavity; and an expansion step of expanding the thermally expandable material to integrate the braiding material, the separation layer, and the mixture.

In this method of producing the flat lightweight member, the braiding material is used as the material constituting the skin layer, and the continuity of the fibers at both end portions in a direction intersecting the longitudinal direction of the flat lightweight member is therefore maintained so that peeling at the end portions and the like can be avoided. In addition, by forming the separation layer into a bag shape having the outer shape of the flat lightweight member, it is possible to prevent displacement of the separation layer during molding and the thermally expandable material from flowing out to the surface layer. As a result, the surface quality is improved, and formation of voids can be prevented so that deterioration of the strength of the end portion can be prevented.

Figure 1B:
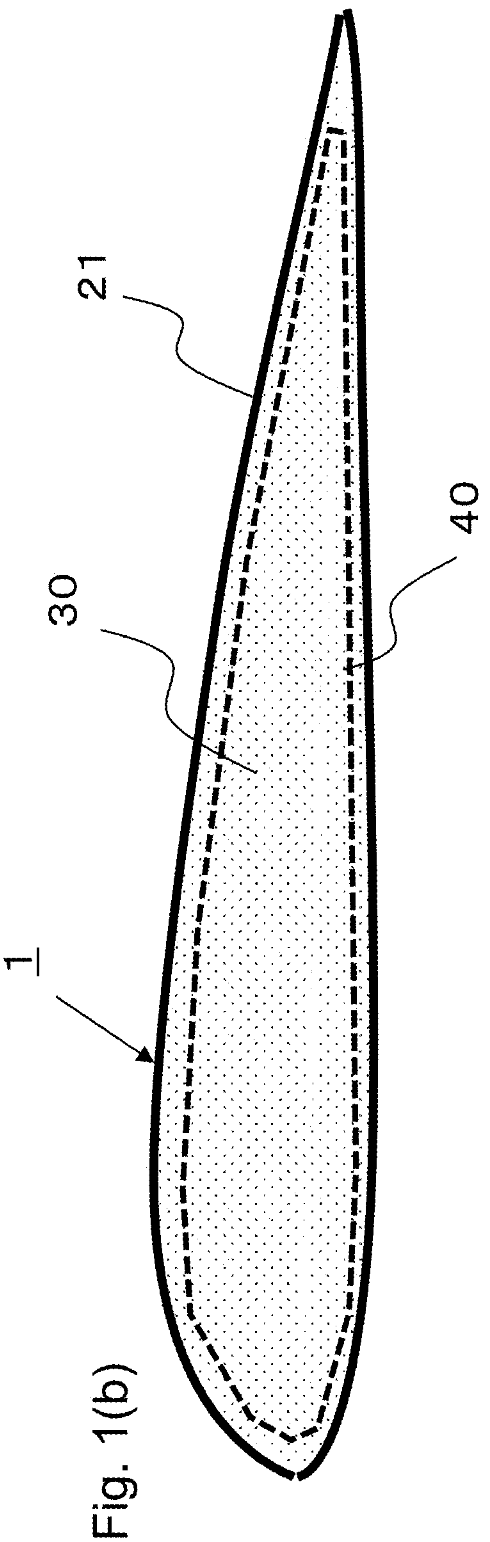

FIG. 1 shows one example of a flat lightweight member obtained by the production method.

In FIG. 1(*a*), the reference sign 1 denotes a top view of the flat lightweight member, in which the right side in the drawing is a tip portion a and the left side in the drawing is a root portion b. FIG. 1(*b*) shows an A-A' cross section of the flat lightweight member 1 (that is, a cross section in a direction intersecting the longitudinal direction of the flat lightweight member 1). The flat lightweight member 1 mainly includes a skin layer 21, a core layer 30, and a separation layer 40.

Figures 4A, 4B, 4C, 4D, 4E, 4F, 4G:
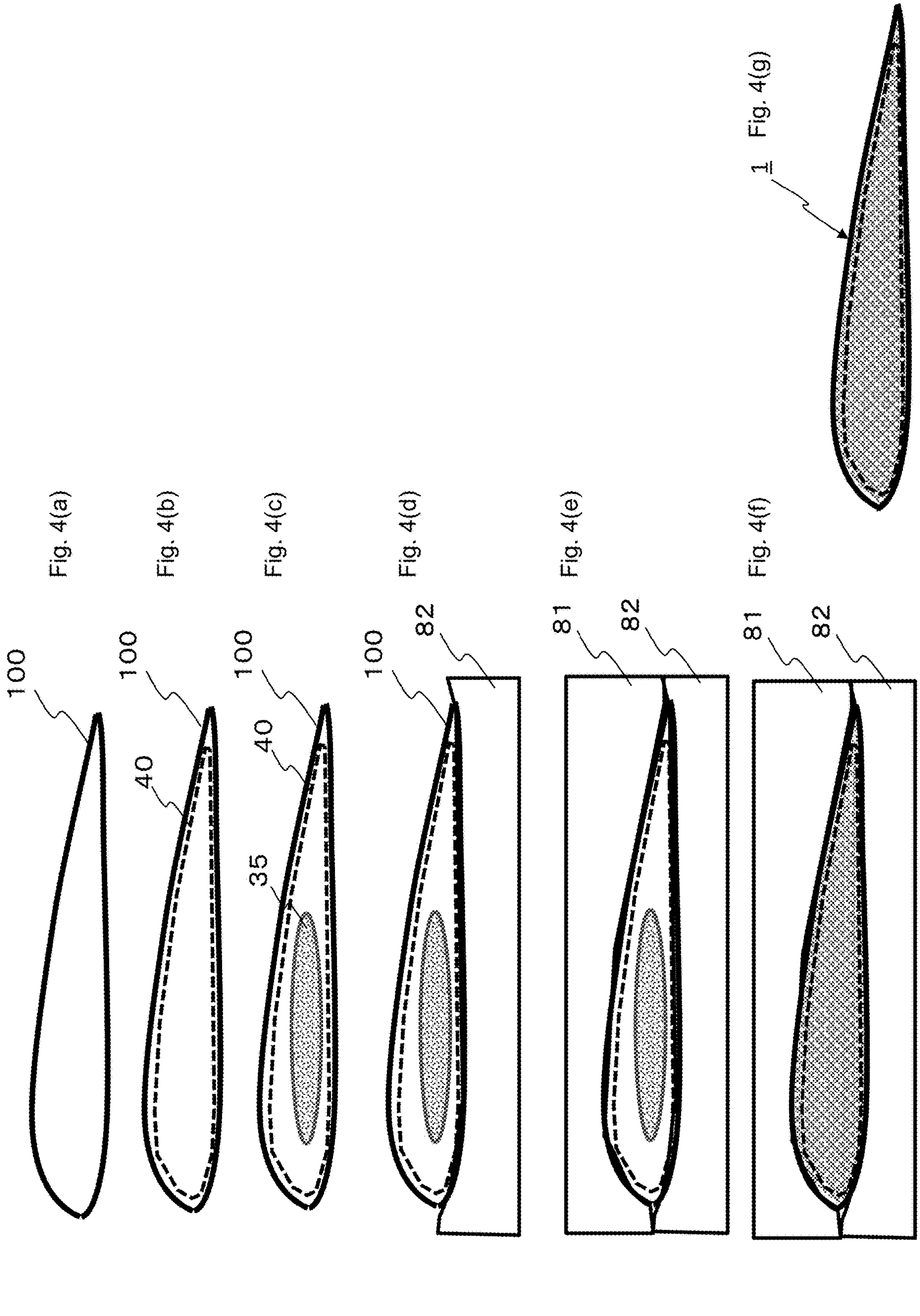
FIGS. 4(*a*)-4(*g*) show each step in the method of producing a flat lightweight member.

FIG. 4 shows each step in the method of producing a flat lightweight member and shows step of molding fiber-reinforced plastics using a two-part mold in which a cavity having the shape of the flat lightweight member is formed by mating surfaces of an upper mold 81 and a lower mold 82. Hereinafter, the steps will be described in order. FIG. 4(*a*) shows a braiding material production step, FIG. 4(*b*) shows a separation layer disposing step, FIG. 4(*c*) shows a charging step of a mixture containing a matrix resin and a thermally expandable material, FIG. 4(*d*) shows a step of disposing the braiding material containing the separation layer and the mixture, FIG. 4(*e*) shows a mold closing step, FIG. 4(*f*) shows an expansion step of expanding a thermally expandable material, and FIG. 4(*g*) shows a flat lightweight member obtained through a demolding step.

Braiding Material Production Step (FIG. 4(*a*))

Figure 5:
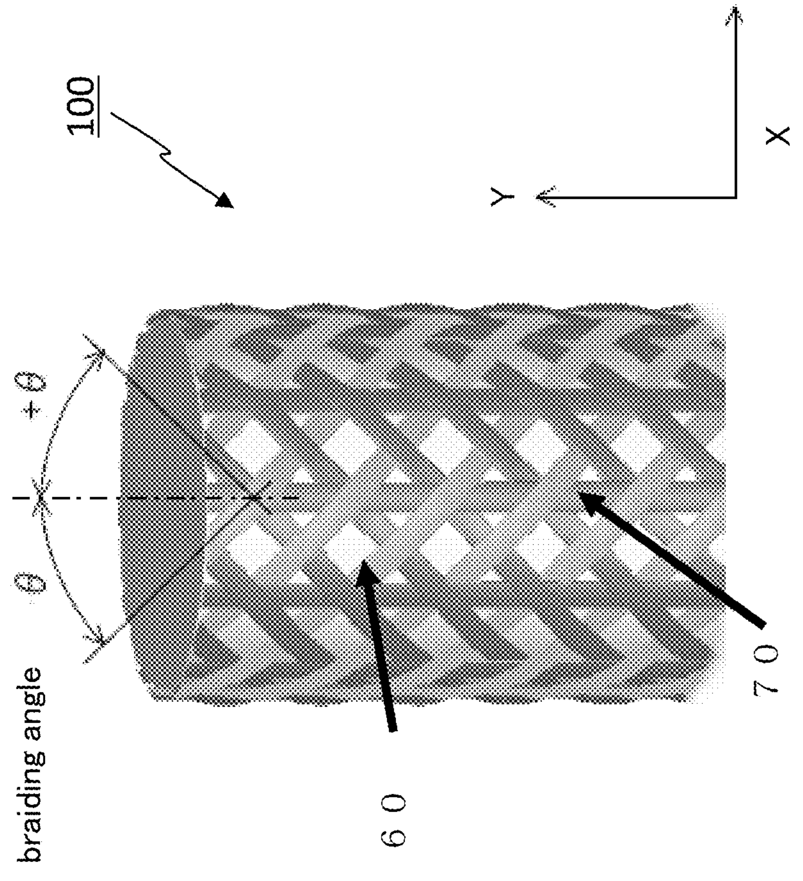
FIG. 5 schematically illustrates an example of a basic braided structure of a braiding material.

The skin layer is composed of at least one layer of a braiding material 100. FIG. 5 schematically illustrates a basic braided structure of the braiding material 100. The braiding material 100 means a fiber material obtained by weaving a fiber strands of reinforcing fibers with a braiding machine and is produced by mechanically interweaving the fiber strands into a three-dimensional shape such as a cylindrical shape by braiding the fiber strands in only two directions as plaited yarns or in three directions including a central yarn in addition to the plaited yarns. With the braiding machine, the braiding material can be laminated while adjusting the braiding angle θ of the fiber strands, and there is no break in the reinforcing fibers except for the end portions in the longitudinal direction of the hollow braiding material so that a molded article having a lighter weight, higher rigidity, and higher strength can be obtained. Further, by using a mandrel having a desired outer shape of the flat lightweight member, a braiding material (such as the braiding material 100 having a shape illustrated in FIG. 4(*a*)) having a product shape can be prepared in advance so that production efficiency can be improved.

If necessary, it is also possible to laminate a plurality of layers of the braiding material. In addition, when the cross-sectional shape of the mandrel changes along the longitudinal direction, the weave can be controlled by increasing the braid angle at a portion where the cross-sectional circumferential length is long and decreasing the braid angle at a portion where the cross-sectional circumferential length is small when the fiber strands are laminated, whereby the braiding material having a small gap can be produced. When it is desired to make the braid angle constant, the size (the number of single yarns constituting the fiber strand) of the fiber strands to be used is reduced, and the gap can be reduced by laminating a plurality of layers of the braiding material. Therefore, the details of the braiding material may be designed according to the performance required for the product.

The mandrel used for production of the braiding is preferably produced as two or more separate parts. This makes it easy to take out the mandrel from the braiding material after producing the braiding material.

Examples of the reinforcing fibers used for the braiding material include organic fibers such as aramid fibers, polyethylene fibers, and polyparaphenylene benzoxadole (PBO) fibers; inorganic fibers such as glass fibers, carbon fibers, silicon carbide fibers, alumina fibers, Tyranno Fiber, basalt fibers, and ceramic fibers; metal fibers such as stainless steel fibers and steel fibers; boron fibers; natural fibers; and modified natural fibers. In particular, carbon fibers are lightweight among these reinforcing fibers, have particularly excellent properties in specific strength and specific modulus, are also excellent in heat resistance and chemical resistance, and thus are suitable for members such as automobile panels for which weight reduction is desired. Among them, PAN based carbon fibers from which high-strength carbon fibers are easily obtained are preferable.

The thickness of the skin layer is preferably 0.1 mm or more and 10 mm or less, more preferably 0.2 mm or more and 5 mm or less, still more preferably 0.4 mm or more and 2 mm or less. This thickness may be set in consideration of the balance between strength and lightweight properties required for the flat lightweight member.

Separation Layer Disposing Step (FIG. 4(*b*))

The separation layer is disposed inside the braiding material obtained in the above-described braiding material production step. The separation layer has a bag shape having an outer shape of the flat lightweight member. With this shape, it is possible to improve the surface quality and further prevent formation of voids by preventing deviation of the separation layer and preventing the thermally expandable material from flowing out to the surface layer during molding of the flat lightweight member. In addition, the occurrence of "resin richness" at the end portion of the flat lightweight member can be ameliorated.

As the separation layer, a thin sheet having a separation function that allows the resin to pass but does not substantially allow the thermally expandable material after thermal expansion to pass is used. For example, a fiber sheet such as a thin nonwoven, woven, or knitted fabric having a small mesh opening or a porous film made of polyethylene, polypropylene or the like is suitable, and two or more of these can be used in combination. The size of the mesh opening is selected in a range in which the thermally expandable material does not pass depending on the type and expandability of the thermally expandable material. As a material of the separation layer, glass fibers, carbon fibers, aramid fibers or the like, which themselves have a function as a reinforcing material, can also be used.

As the separation layer, one having a desired outer shape of the flat lightweight member is used. The "outer shape of the flat lightweight member" may be a shape identical to the shape of the flat lightweight member, an affine-transformed shape obtained by affine transformation of the flat lightweight member, or an offset shape obtained by offsetting the flat lightweight member in the thickness direction. The dimensions of the separation layer may be equal to or different from those of the flat lightweight member. In different dimensions, for example, only one axis or two or more axes in the orthogonal coordinate system are preferably set to 80% or more and 150% or less of the original dimensions of the flat lightweight member by the affine transformation or offset described above. That is, the separation layer has a shape corresponding to a desired outer shape of the flat lightweight member.

Charging Step of Mixture Containing Matrix Resin and Thermally Expandable Material (FIG. 4(*c*))

Subsequently, the thermally expandable material and the matrix resin are charged into the separation layer disposed inside the braiding material as described above. The core layer is formed of the thermally expandable material and the matrix resin (a first matrix resin).

The weight ratio between the thermally expandable material and the first matrix in the core layer is preferably 5% or more and 100% or less, more preferably 10% or more and 40% or less, with the weight of the first matrix resin being 100%. When the weight of the thermally expandable material is 5% or more, the specific gravity of the core layer decreases, and lightweight properties are easily exhibited. In addition, when the ratio is 10% or more, it is possible to reduce partial "resin richness" caused by separation of the first matrix resin from the thermally expandable material so that the core layer has a more homogeneous structure, and variations in the center of gravity can be reduced. On the other hand, when the ratio is 100% or less, the first matrix resin can be present between the thermally expandable material to crosslink the thermally expandable material, and the core layer can be rigid to maintain the shape. When the ratio is more than 100%, the core layer becomes brittle due to insufficient crosslinking between the thermally expandable material, and the shape is easily deformed. Furthermore, when the ratio is 40% or less, the first matrix resin can cover the periphery of the thermally expandable material so that the formation of cracks in the core layer is suppressed, and good mechanical properties of the core layer can be maintained for a long period of time.

Matrix Resin

Examples of the first matrix resin include thermosetting resins such as epoxy resins, unsaturated polyester resins, vinyl ester resins, phenol resins, epoxy acrylate resins, urethane acrylate resins, phenoxy resins, alkyd resins, urethane resins, maleimide resins, and cyanate resins; and thermoplastic resins such as polyamide resins, polyacetal resins, polyacrylate resins, polysulfo resinsne, acrylic butadiene styrene (ABS) resins, polyester resins, acrylic resins, polybutylene terephthalate (PBT) resins, polyethylene terephthalate (PET) resins, polyethylene resins, polypropylene resins, polyphenylene sulfide (PPS) resins, polyether ether ketone (PEEK) resins, liquid crystal polymers, polyvinyl chloride, fluorine-based resins such as polytetrafluoroethylene, and silicone. Among them, it is particularly preferable to use a thermosetting resin. When the first matrix resin is a thermosetting resin, the cured matrix resin covers the periphery of the thermally expandable material of the core layer to form a porous structure so that deformation and expansion of the core layer can be prevented even when heat is applied to the fiber reinforced plastics.

Thermally Expandable Material

The thermally expandable material means thermally expandable resin particles that undergo volume expansion when their temperature is raised by heating during molding, and a thermally expandable material already thermally expanded but can be compressed by pressurization.

The thermally expandable material undergoes volume expansion when mixed with the first matrix resin and heated; when the first matrix resin is a thermosetting resin, the thermosetting resin is cured to form a core layer having a lightweight porous structure. When the first matrix resin is a thermoplastic resin, the molten thermoplastic resin is solidified or the softened thermoplastic resin is bound during cooling, thereby forming a core layer having a lightweight porous structure.

A volume expansion coefficient α (%) of the mixture of the thermally expandable material and the first matrix resin is expressed by formula (1) where the volume of the mixture before expansion is V1 ($cm^3$) and the volume after expansion is V2 ($cm^3$):

$$\alpha=100\times(V2-V1)\div V1 \quad (1).$$

The volume expansion coefficient α varies depending on the weight ratio between the thermally expandable material and the first matrix resin as well as the heating condition during molding, but it is preferably 30% or more and 2,000% or less.

Examples of the thermally expandable material include a polyacrylonitrile-based co-polymer, a polymethacrylonitrile-based copolymer, a polyvinylidene chloride-based copolymer, polystyrene or a polystyrene-based copolymer, a polyolefin, and a polyphenylene oxide-based copolymer, and capsule-shaped particles containing a thermally expandable gas therein are preferable. In particular, a thermally expandable material in which a hydrocarbon having a low boiling point is used as a thermally expandable gas is preferable because its volume expansion coefficient is large and a lightweight core layer can be molded.

The size of the thermally expandable particles is preferably such that the average particle diameter before volume expansion is 1 μm to 1 mm. When the average particle shape is 1 μm or more, leakage of the thermally expandable material to the surface of the fiber reinforced plastics due to resin flow during molding can be suppressed. When the diameter is 1 mm or less, even when the core layer has a thin portion, the thermally expandable material intrudes into the portion so that the core layer can be made lightweight, and the density unevenness of the thermally expandable particles and the first matrix resin in the core layer can be reduced.

Examples of such a thermally expandable material include "Matsumoto Microsphere" (registered trademark) manufactured by Matsumoto Yushi-Seiyaku Co., Ltd., "Expancel" (registered trademark) manufactured by Akzo Nobel N.V., and "ESLEN Beads" manufactured by Sekisui Chemical Co., Ltd., but this disclosure is not limited to these products.

Only one type of thermally expandable material may be used, or a plurality of types of thermally expandable materials may be mixed and used. In addition, the thermally expandable material may be used alone or may be used in a state of being mixed with particles that do not thermally expand such as glass beads.

In the charging step of charging the mixture of the resin and the thermally expandable material inside the separation layer, it is preferable to preheat the mixture of the thermally expandable material and the first matrix resin. By using such a method, the viscosity of the mixture of the thermally expandable material and the first matrix resin is reduced so that the charging time can be shortened and the charging amount can be easily adjusted. The mixture of the thermally expandable material and the first matrix resin can be preheated using an oven or a microwave oven. In addition, after the resin and the thermally expandable material are charged inside the separation layer, the end portion of the separation layer can be sealed with a heat sealer or the like, or the end portion can be folded into several plies as necessary. This procedure makes it possible to prevent outflow of the thermally expandable material from the separation layer.

Step of Disposing Braiding Material Containing Separation Layer and Mixture in Mold (FIG. 4(*d*))

Subsequently, the braiding material in which the separation layer and the mixture are present, obtained through the charging step described above, is disposed in the lower mold. The molding temperature to be set as the temperature of the lower mold depends on the type of the first matrix resin, but when a thermosetting resin is used, the molding temperature is preferably in the temperature range of 80° C. or more and 230° C. or less. When the temperature is 80° C. or more, the reaction of the matrix resin can be accelerated; when the temperature is 230° C. or less, the decomposition of the matrix resin can be suppressed. In the method of producing fiber-reinforced plastics, it is not necessary to raise or lower the temperature of the mold so that the production time can be shortened as compared with a conventional method including raising and lowering the temperature of the mold. Further, since the braiding material is formed into a three-dimensional shape contoured to the shape of the product in advance, positioning can be relatively easily performed.

Mold Closing Step (FIG. 4(*e*) to Demolding Step FIG. 4(*g*))

Subsequently, the upper mold heated to the molding temperature is closed with respect to the lower mold in which the braiding material containing the separation layer and the mixture therein is disposed in the above-described step. By the mold closing step, the inside of the mold cavity having a desired shape of the flat lightweight member becomes airtight, and the air is exhausted to evacuate the inside of the mold cavity.

The temperature of the upper mold is preferably set to the same temperature as the temperature of the lower mold, but this disclosure is not limited thereto.

Then, the air in the mold is discharged to vacuum the inside of the cavity so that the thermally expandable material starts to expand after reaching a predetermined temperature to form the core layer. Due to the expansion of the thermally expandable material, the first matrix resin penetrates the separation layer, is impregnated into the skin layer, is pressed against the mold cavity, and is pressurized so that a fiber reinforced plastics of excellent quality can be obtained.

Through such a mold closing step, voids in the skin layer can be reduced to improve the mechanical properties of the flat lightweight member, and formation of bubbles on the surface can be prevented so that a flat lightweight member made of fiber reinforced plastics excellent in appearance quality can be obtained.

MORE PREFERRED EXAMPLE

The braiding material is constituted of a plurality of fiber strands serving as central yarns arranged in parallel in the same direction and a fiber strand serving as a plaited yarn intersecting the central yarns, there is preferably a difference in size of the fiber strands of the central yarns to be used between the central region and an end region in a cross section in a direction intersecting the longitudinal direction of the flat lightweight member, and it is particularly preferable that a fiber strand serving as a central yarn used in an end region on at least one side of the flat lightweight member be smaller than a fiber strand serving as a central yarn used in the central region of the flat lightweight member.

Figure 6A:
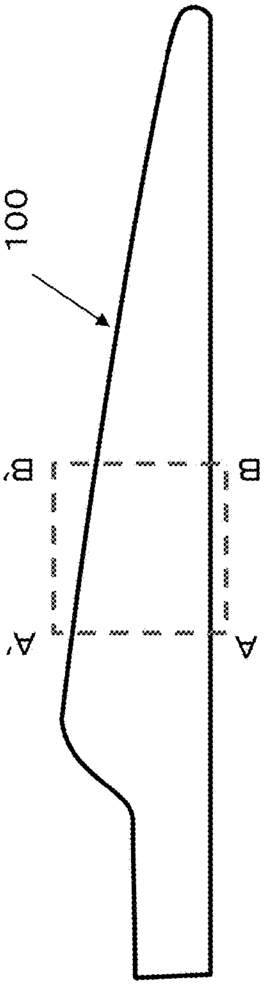
FIG. 6(*a*) is a top view showing only an outline of the braiding material in the flat lightweight member, and FIG. 6(*b*) is a partially enlarged schematic view of the top view of FIG. 6(*a*).
Figure 6B:
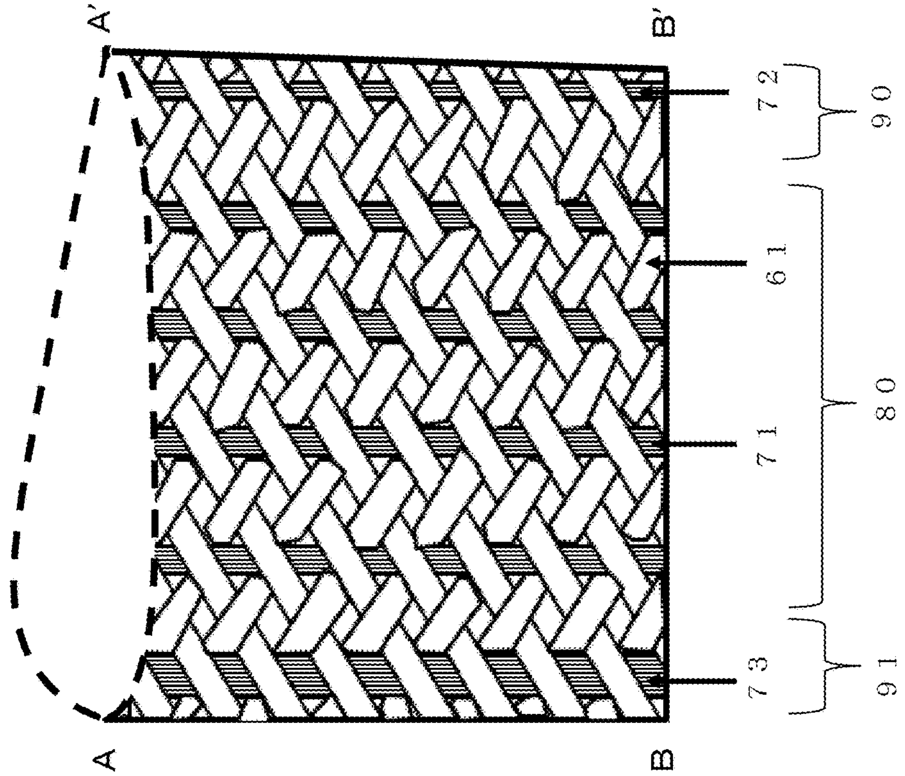

FIG. 6(*a*) is a top view showing only the outline of the braiding material in the form of a flat lightweight member, and FIG. 6(*b*) schematically shows a fiber strand braided form when a part of the top view of FIG. 6(*a*) is viewed from a side surface. The schematic diagrams here show an example, and the number of fiber strands to be used is not limited thereto. In the flat lightweight member, a central yarn 72 in an end region 90 is composed of a fiber strand smaller than a central yarn 71 used in a central region 80. From the viewpoint of energy efficiency, when the shape of at least one end portion of the flat lightweight member is a sharp shape, it is preferable to use a small fiber strand for the central yarn in the end region. As described above, by disposing an appropriate amount of reinforcing fibers at the end portion, it is possible to prevent the occurrence of peeling during production, and even when dry fibers are used, it is possible to prevent the formation of a portion that is not impregnated with the resin in the flat lightweight member.

The end region where relatively small fiber strands are arranged as described above is preferably a region from the end of the flat lightweight member to a position which is five times the length away of the thickness of the skin layer, in a cross section in a direction intersecting the longitudinal direction of the flat lightweight member. The region is more preferably a region from the end of the flat lightweight member to a position which is 10 times the length away of the thickness of the skin layer. The region is further preferably a region from the end of the flat lightweight member to a position which is 20 times the length away of the thickness of the skin layer. On the other hand, the central region where relatively large fiber strands are arranged is preferably a region in the range of ±30% from the central position in the longitudinal direction of a cross section in a direction intersecting the longitudinal direction of the flat lightweight member.

Examples of the method of reducing the size of the fiber strands include a method of reducing the number of single yarns constituting the fiber strand, using a fiber strand constituted of thin single yarns (single yarns with small diameters), or using a fiber strand of thick single yarns (single yarns with large diameters) and reducing the number of single yarns, to reduce the weight per unit length of the fiber strand to be input. The method is not limited thereto, and a plurality of methods or a plurality of fibers can be combined.

On the other hand, the braiding material includes a plurality of fiber strands serving as central yarns arranged in parallel in the same direction and a fiber strand serving as a plaited yarn intersecting the central yarns, and it is also preferable that a fiber strand serving as a central yarn used in an end region on at least one side of the flat lightweight member be larger than a fiber strand serving as a central yarn used in the central region of the flat lightweight member.

In the flat lightweight member shown in FIG. 6, a central yarn 73 in an end region 91 is composed of a fiber strand larger than the central yarn 71 used in the central region 80. When the shape of at least one end portion of the flat lightweight member is a round shape thicker than the other portions, it is possible to improve the end strength by using a large fiber strand as the central yarn in the end region. According to such a method, positional displacement is less likely to occur as compared to when another reinforcing material is additionally disposed so that it is possible to obtain a stable molded article with small variation.

The end region where relatively large fiber strands are arranged as described above is preferably a region from the end of the flat lightweight member to a position which is five times the length away of the thickness of the skin layer in a cross section in a direction intersecting the longitudinal direction of the flat lightweight member. The region is more preferably a region from the end of the flat lightweight member to a position which is 10 times the length away of the thickness of the skin layer. The region is further preferably a region from the end of the flat lightweight member to a position which is 20 times the length away of the thickness of the skin layer. On the other hand, the central region where relatively small fiber strands are arranged is preferably a region in the range of ±30% from the central position in the longitudinal direction of a cross section in a direction intersecting the longitudinal direction of the flat lightweight member.

Examples of the method of increasing the size of the fiber strands include a method of increasing the number of single yarns constituting the fiber strand, using a fiber strand constituted of thick single yarns (single yarns with large diameters), or using a fiber strand of thin single yarns (single yarns with small diameters) and increasing the number of single yarns, to increase the weight per unit length of the fiber strand to be input. The method is not limited thereto, and a plurality of methods or a plurality of fibers can be combined.

In the braiding material, it is preferable that a fiber strand serving as a central yarn used in an end region on one side of the flat lightweight member be smaller than a fiber strand serving as a central yarn used in the central region of the flat lightweight member and that a fiber strand serving as a central yarn used in an end region on the other side of the flat lightweight member be larger than the fiber strand serving as the central yarn used in the central region of the flat lightweight member. When the shape of the end portion on one side of the flat lightweight member is sharp and the other end has a round shape thicker than the other portion, a fiber strand smaller than the fiber strand serving as the central yarn used in the central region of the flat lightweight member is used in the sharp end region, and a fiber strand larger than the fiber strand serving as the central yarn used in the central region of the flat lightweight member is used in the rounded end region so that the strength of both end portions can be improved and the end portion on the sharp side can be prevented from being not impregnated with the resin.

Both the fiber strands serving as the central yarns and the fiber strand serving as the plaited yarn constituting the braiding material are preferably dry fiber strands. In this example, the process passability in a braiding machine is good, and the braiding material can be stably produced.

On the other hand, both the fiber strands serving as the central yarns and the fiber strand serving as the plaited yarn constituting the braiding material are preferably a prepreg containing a resin. In this example, the shape stability of the braiding material can be further improved. Examples of a second matrix resin used in the prepreg include thermosetting resins such as epoxy resins, unsaturated polyester resins, vinyl ester resins, phenol resins, epoxy acrylate resins, urethane acrylate resins, phenoxy resins, alkyd resins, urethane resins, maleimide resins, and cyanate resins; and thermoplastic resins such as polyamide resins, polyacetal resins, polyacryla resinste, polysulfone resins, acrylic butadiene styrene (ABS) resins, polyester resins, acrylic resins, polybutylene terephthalate (PBT) resins, polyethylene terephthalate (PET) resins, polyethylene resins, polypropylene resins, polyphenylene sulfide (PPS) resins, polyether ether ketone (PEEK) resins, liquid crystal polymers, polyvinyl chloride, fluorine-based resins such as polytetrafluoroethylene, and silicone. Among them, it is particularly preferable to use a thermosetting resin.

Another preferable production method is as follows. That is, a method of producing a flat lightweight member including at least one rib portion includes:

- a braiding material production step of producing a braiding material constituting a skin layer;
- a preparation step of preparing a fiber reinforced material constituting a rib portion;
- a rib disposing step of disposing inside the braiding material the fiber reinforced material constituting the rib portion to divide the inside of the braiding material into two or more spaces;
- a separation layer disposing step of disposing in the two or more spaces a separation layer having a bag-like shape of the two or more spaces;
- a charging step of charging a mixture of a matrix resin and a thermally expandable material inside the separation layer;
- a material disposing step of disposing on a lower mold heated to a molding temperature the braiding material containing the separation layer, the mixture, and the fiber reinforced material constituting the rib portion disposed inside;
- a mold closing step of closing an upper mold heated to the molding temperature and vacuuming the inside of a mold cavity; and
- an expansion step of expanding the thermally expandable material to integrate the braiding material, the separation layer, the mixture, and the fiber reinforced material constituting the rib portion.

With this configuration, the continuity of the fibers at both end portions in a direction intersecting the longitudinal direction of the flat lightweight member is maintained, and the occurrence of peeling at the end portions can be prevented. In addition, by forming the separation layer into a bag shape having shapes of spaces separated by the fiber reinforced material constituting the rib portion, displacement of the separation layer during molding can be prevented, and the thermally expandable material can be prevented from flowing out to the surface layer so that a flat lightweight member having good surface quality is obtained. Formation of voids can also be prevented so that deterioration of the strength of the end portion can be prevented. Further, according to this example, it is possible to easily obtain a flat lightweight member having a rib portion and higher strength with high productivity.

The shape of the separation layer may be a shape identical to the shape of the spaces separated by the fiber reinforced material, an affine-transformed shape obtained by affine transformation of the divided spaces, or an offset shape obtained by offsetting the divided spaces in the thickness direction. The dimensions of the separation layer may be equal to or different from those of the divided spaces. In different dimensions, for example, only one axis or two or more axes in the orthogonal coordinate system are preferably set to 80% or more and 150% or less of the original dimensions of the divided spaces by the affine transformation or offset described above. That is, it is sufficient that the separation layer has a shape corresponding to a desired outer shape of the flat lightweight member.

Figures 2A, 2B, 2C, 2D:
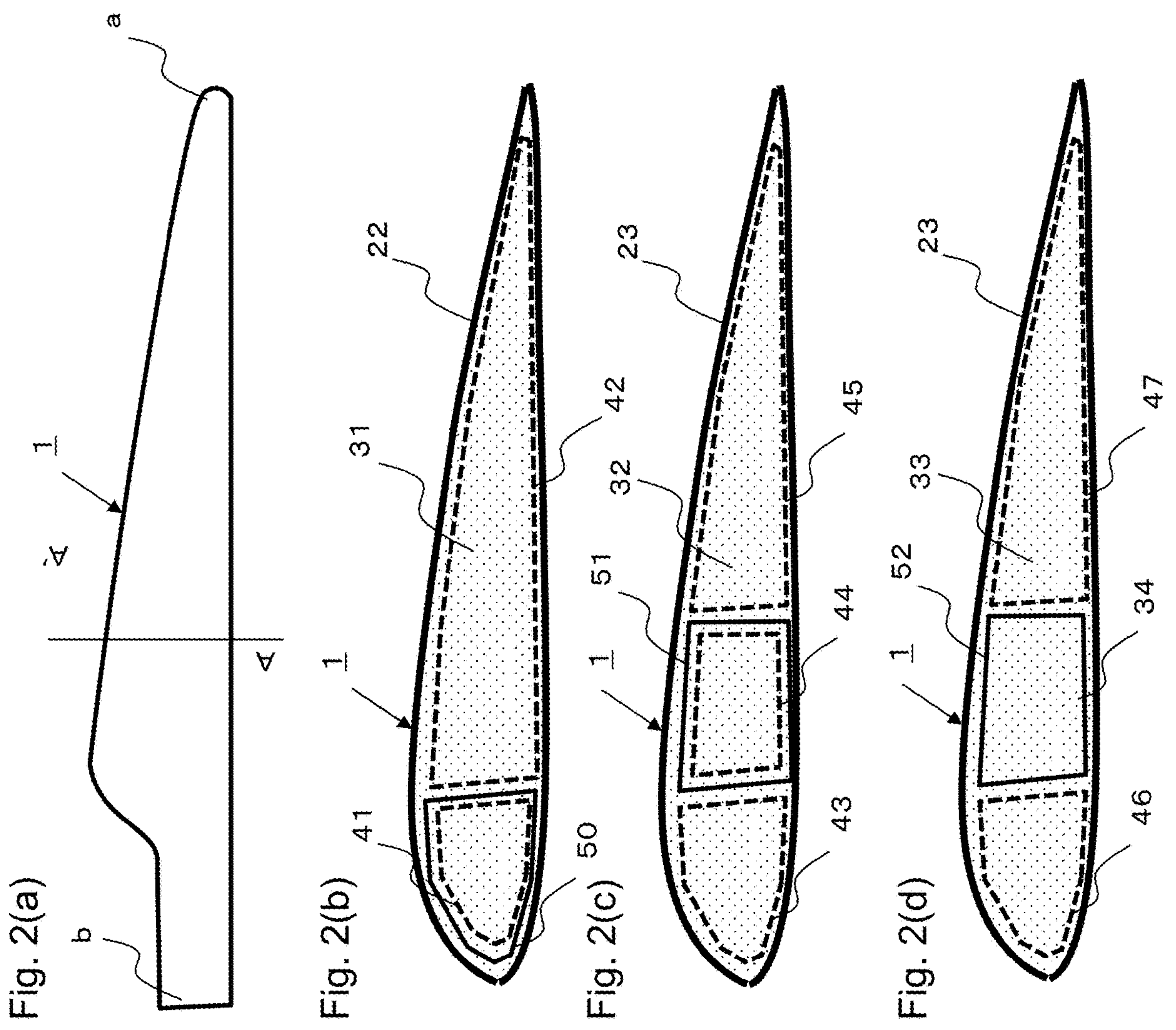
FIG. 2(*a*) is a top view, and FIGS. 2(*b*) to 2(*d*) are cross-sectional views taken along the line A-A', in examples of the flat lightweight member obtained by our method.
Figure 3A:
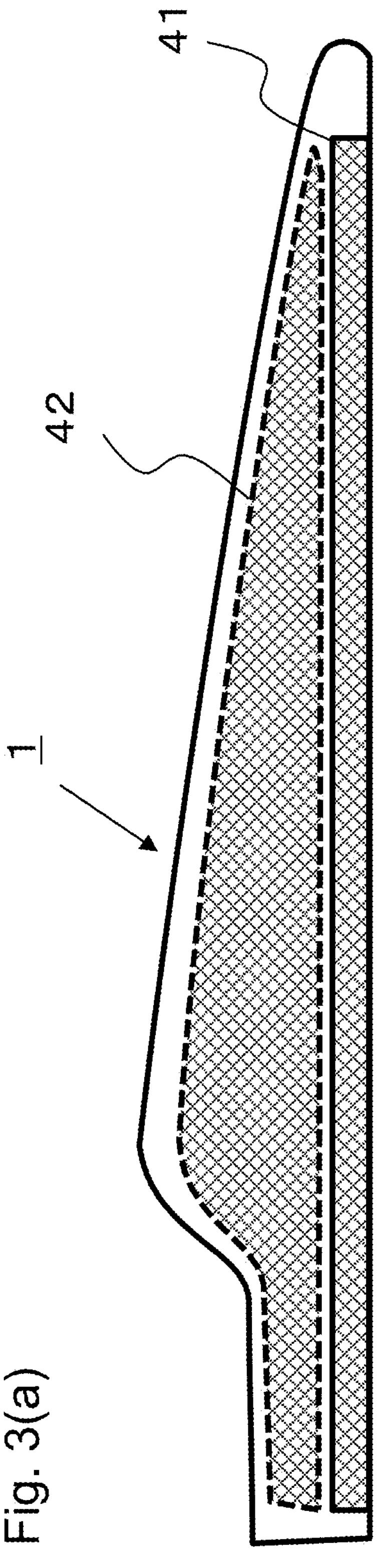
FIGS. 3(*a*) and 3(*b*) include top perspective views showing examples of the shapes of separation layers in the flat lightweight members shown in FIGS. 2(*b*) and 2(*c*).
Figure 3B:
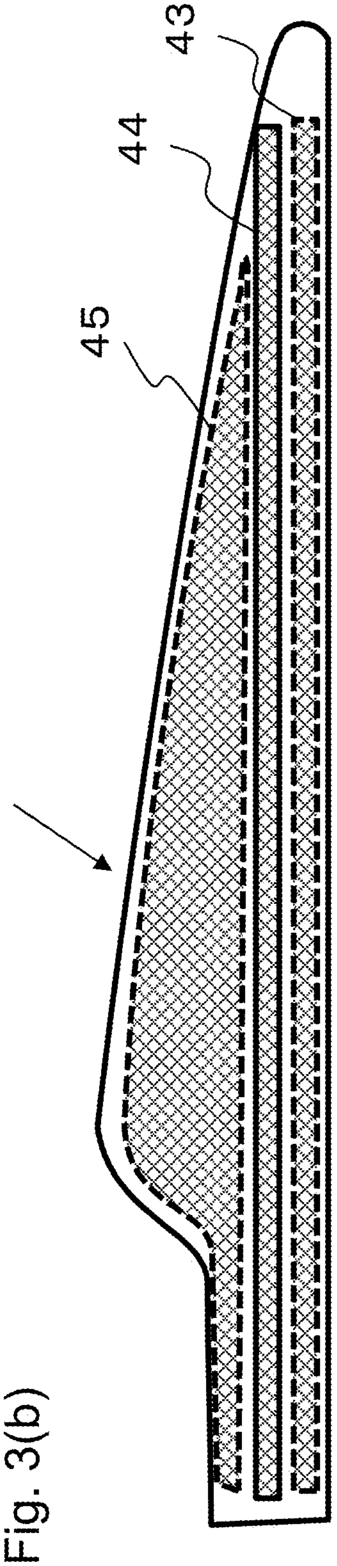

FIGS. 2(*a*)-2(*d*) and 3(*a*)-3(*b*) show one example of a flat lightweight member obtained by the production method. FIG. 2(*a*) is a top view of the flat lightweight member, in which the right side in the drawing is the tip portion a and the left side in the drawing is the root portion b. A cross section A-A' of the flat lightweight member 1 is shown in FIGS. 2(*b*) to 2(*d*). FIG. 2(*b*) illustrates when one rib portion is provided, and FIGS. 2(*c*) and 2(*d*) illustrate when two rib portions are provided. FIGS. 3(*a*) and 3(*b*) are top perspective views of the flat lightweight members respectively corresponding to FIG. 2(*b*) and FIGS. 2(*c*) and 2(*d*) and illustrate the shapes of the separation layers.

In our production method, the rib portion can be easily formed according to rigidity and strength required for the member. As the fiber reinforced material constituting the rib portion, a braiding material may be used as with the skin layer, and the above-described prepreg can also be used. Further, as shown in FIG. 2(*d*), it is also possible to dispose a core material 34 molded in advance into a desired shape inside the fiber reinforced material constituting the rib portion. When the rib portion is constituted of the core material and the fiber reinforced material disposed around the core material 34, molding can be performed with the position of the rib portion being stable. As the core material 34, a foam, a resin block, wood or the like can be used, but a foam is preferable from the viewpoint of weight reduction. Examples of the material of the foam and the resin block include thermosetting resins such as epoxy resins, unsaturated polyester resins, vinyl ester resins, phenol resins, epoxy acrylate resins, urethane acrylate resins, phenoxy resins, alkyd resins, urethane resins, maleimide resins, and cyanate resins; and thermoplastic resins such as polyamide resins, polyacetal resins, polyacryla resinste, polysulfone resins, acrylic butadiene styrene (ABS) resins, polyester resins, acrylic resins, polybutylene terephthalate (PBT) resins, polyethylene terephthalate (PET) resins, polyethylene resins, polypropylene resins, polyphenylene sulfide (PPS) resins, polyether ether ketone (PEEK) resins, liquid crystal polymers, polyvinyl chloride, fluorine-based resins such as polytetrafluoroethylene, and silicone. As a method of molding the core material core material, a method of foaming and injecting into a mold, a method of forming with a 3D printer or the like can be used.

INDUSTRIAL APPLICABILITY

Our concepts can be applied to a flat lightweight member including any plate-shaped fiber reinforced plastics and the production thereof. Further, the flat lightweight member obtained is suitably used as, for example, transportation facilities such as aircraft, automobiles, and ships or as a propeller blade structure in the sports and leisure fields.

The invention claimed is:

1. A flat lightweight member comprising:

a skin layer including a braiding material and a matrix resin;

a separation layer having a bag shape and present inside the braiding material; and a mixture of a matrix resin and a thermally expandable material, the mixture present inside the separation layer;

wherein the braiding material includes a plurality of fiber strands serving as central yarns arranged in parallel in a same direction and a fiber strand serving as a plaited yarn intersecting the central yarns, and a weight per unit length of one of the fiber strands serving as the central yarns used in at least one end region of the flat lightweight member is smaller than a weight per unit length of one of the fiber strands serving as the central yarns used in a central region of the flat lightweight member.

2. The flat lightweight member according to claim 1, wherein a weight per unit length of one of the fiber strands serving as the central yarns used in another end region of the flat lightweight member is larger than a weight per unit length of the one of the fiber strands serving as the central yarns used in the central region of the flat lightweight member.

3. The flat lightweight member according to claim 1, further comprising at least one rib portion containing a fiber reinforced material inside the braiding material, wherein the separation layer and the mixture are present in each of a plurality of regions inside the braiding material separated by the rib portion.

4. The flat lightweight member according to claim 3, wherein the rib portion includes the fiber reinforced material and a foam and/or a resin block disposed inside the fiber reinforced material.

5. A method of producing a flat lightweight member of claim 1, the method comprising:

a braiding material production step of producing the braiding material constituting the skin layer;

a separation layer disposing step of disposing the separation layer having a bag shape corresponding to an outer shape of the flat lightweight member inside the braiding material;

a charging step of charging the mixture of the matrix resin and the thermally expandable material inside the separation layer;

a step of disposing in a cavity of a lower mold heated to a molding temperature the braiding material containing the separation layer and the mixture disposed inside;

a mold closing step of closing an upper mold heated to the molding temperature and vacuuming the inside of the cavity; and an expansion step of expanding the thermally expandable material to integrate the braiding material, the separation layer, and the mixture.

6. The method for producing a flat lightweight member according to claim 5, wherein in the braiding material production step, the plurality of fiber strands serving as central yarns arranged in parallel in a same direction and the fiber strand serving as the plaited yarn intersecting the central yarns constitute the braiding material, and a fiber strand smaller than one of the fiber strands serving as the central yarns in the central region of the flat lightweight member is used for one of the fiber strands serving as the central yarns in at least one end region of the flat lightweight member.

7. The method according to claim 5, wherein in the braiding material production step, the plurality of fiber strands serving as central yarns arranged in parallel in a same direction and the fiber strand serving as the plaited yarn intersecting the central yarns constitute the braiding material, a fiber strand smaller than one of the fiber strands serving as the central yarns in the central region of the flat lightweight member is used for one of the fiber strands serving as the central yarns in one end region of the flat lightweight member, and a fiber strand larger than the one of the fiber strands serving as the central yarns in the central region of the flat lightweight member is used for one of the fiber strands serving as the central yarns in another end region of the flat lightweight member.

8. The method according to claim 5, wherein both the fiber strands serving as the central yarns and the fiber strand serving as the plaited yarn constituting the braiding material are dry fiber strands.

9. The method according to claim 5, wherein both the fiber strands serving as the central yarns and the fiber strand serving as the plaited yarn constituting the braiding material are a prepreg containing a resin.

10. A method of producing a flat lightweight member including at least one rib portion according to claim 3, the method comprising:

a braiding material production step of producing the braiding material constituting the skin layer;

a preparation step of preparing the fiber reinforced material constituting the rib portion;

a rib disposing step of disposing inside the braiding material the fiber reinforced material constituting the rib portion to divide inside of the braiding material into two or more spaces;

a separation layer disposing step of disposing in the two or more spaces the separation layer having a bag shape corresponding to shapes of the two or more spaces;

a charging step of charging the mixture of the matrix resin and the thermally expandable material inside the separation layer;

a material disposing step of disposing on a lower mold heated to a molding temperature the braiding material containing the separation layer, the mixture, and the fiber reinforced material constituting the rib portion disposed inside;

a mold closing step of closing an upper mold heated to the molding temperature and vacuuming the inside of a mold cavity; and an expansion step of expanding the thermally expandable material to integrate the braiding material, the separation layer, the mixture, and the fiber reinforced material constituting the rib portion.

11. The method according to claim 10, wherein the rib portion is constituted of the fiber reinforced material and a foam and/or wood disposed inside the fiber reinforced material.

* * * * *